United States Patent [19]

Stepputat et al.

[11] 3,907,836

[45] Sept. 23, 1975

[54] PROCESS FOR PURIFYING ANTHRAQUINONE

[75] Inventors: Jürgen Stepputat, Leverkusen; Gerhard Jung, Opladen; Hermann Wunderlich, Odenthal-Hahnenberg, all of Germany

[73] Assignee: Bayer Aktiengesellschaft, Leverkusen, Germany

[22] Filed: Dec. 12, 1973

[21] Appl. No.: 424,233

[30] Foreign Application Priority Data

Dec. 23, 1972 Germany............................ 2263247

[52] U.S. Cl. ............................................... 260/369
[51] Int. Cl.² ........................................ C07C 49/68
[58] Field of Search ..................................... 260/369

[56] References Cited
UNITED STATES PATENTS

| | | | |
|---|---|---|---|
| 275,128 | 4/1883 | Brönner | 260/369 |
| 1,404,056 | 1/1922 | Portheim | 260/369 |
| 1,420,198 | 6/1922 | Lewis | 260/369 |
| 2,438,148 | 3/1948 | Corson et al. | 260/369 UX |
| 2,860,036 | 11/1958 | Lait | 260/369 X |

FOREIGN PATENTS OR APPLICATIONS

| | | | |
|---|---|---|---|
| 389,878 | 2/1924 | Germany | 260/369 |

*Primary Examiner*—Paul F. Shaver
*Attorney, Agent, or Firm*—Burgess, Dinklage & Sprung

[57] ABSTRACT

Anthraquinone is purified by using cyclohexanone alone or in admixture with cyclohexanol, or either of these substituted by methyl, as the solvent for the purification of crude anthraquinone. Preferably a mixture of cyclohexanone and cyclohexanol is used with the latter in a larger proportion.

3 Claims, No Drawings

PROCESS FOR PURIFYING ANTHRAQUINONE

BACKGROUND

This invention relates to a process for the purification of anthraquinone, and to the use of the mother liquor accumulating during this process.

It has long been known that the crude anthraquinone obtained during the oxidation of anthracene can be purified by using as solvents, pyridine bases, nitrobenzene or aniline, or their homologues (German Pat. No. 137,495). Unfortunately, these solvents have certain considerable disadvantages. Apart from their odor, their toxicity makes it necessary to maintain the corresponding maximum safe concentrations in workrooms or MAK-values (see Gesundheitsschadliche Arbeitsstoffe, Library of Congress Catalog Card 72-78580)(for example pyridine, MAK-value = 5 ppm, nitrobenzene, MAK-valve = 1 ppm, aniline, MAK-value = 5 ppm) and this requires the use of elaborate apparatus. In addition, these compounds are not entirely stable at elevated temperature, so that their recovery by distillation is always accompanied by losses. In addition, unreacted anthracene is virtually impossible to recover from the mother liquors left after the dissolution and crystallisation of anthraquinone, because the residue left following the removal of the solvent contains unreacted anthracene, impurities emanating from the crude anthracene and their oxidation products and, in the case of chromate oxidation, inorganic constituents, and these cannot be separated at reasonable cost.

In addition, the abrasive properties of this coke-like, high-melting and extremely hard residue provide considerable problems in terms of apparatus.

SUMMARY

It has now been found that the difficulties and losses accompanying recovery of the solvents used to purify crude anthraquinone can be avoided by using as solvents, cyclohexanone and/or its methyl homologues, optionally in admixture with cyclohexanol and/or its methyl homologues.

DESCRIPTION

In the context of the invention, the terms "cyclohexanone" and "cyclohexanol" also include their methyl homologues (i.e., each substituted by Methyl), in accordance with the foregoing.

Although it is sufficient to add one part by weight of cyclohexanol to 9 parts by weight of cyclohexanone, it is generally preferred to use a mixture of cyclohexanone with a larger proportion of cyclohexanol. The mixing ratio generally amounts to between 3 to 7 parts by weight of cyclohexanone and 7 to 3 parts by weight of cyclohexanol.

It is preferred to use cyclohexanone and cyclohexanol in a mixing ratio of 5 to 5, i.e. in equal parts by weight.

In general, the cyclohexanone or mixture of cyclohexanone and cyclohexanol is used in a quantity by weight of 3 to 8 times, preferably 4 to 6 times, based on the quantity of crude anthraquinone In general, the process according to the invention is carried out by heating the crude anthraquinone, which contains small quantities of phenanthrene, fluorine, anthrone and other trinuclear and polynuclear aromatic fractions and their oxidation products, while stirring in the corresponding quantity of cyclohexanone or the cyclohexanone/cyclohexanol mixture up to about the boiling point of the solvent or solvent mixture. The water still present in the crude anthraquinone distills off together with small quantities of solvent. Most of the crude anthraquinone used is dissolved together with the impurities. This is followed by cooling to room temperature, i.e., to around 30°C. The pure anthraquinone crystallises out, whilst the impurities remain in solution. The pure anthraquinone is then isolated by filtration under suction, the residual pure anthraquinone freed from the mother liquor adhering to it by washing with fresh cyclohexanone or cyclohexanone/cyclohexanol mixture and dried.

The solvent used for washing the pure anthraquinone can be used with advantage, for purifying crude anthraquinone in a following cycle, whilst the mother liquor filtered off which, in addition to trinuclear and polynuclear aromatic fractions and their oxidation products, still contains small quantities of anthraquinone and non-oxidised anthracene, can be used with particular advantage for purifying the anthracene before it is introduced into the oxidation stage, as known per se (German Pat. No. 389,878). In this connection, therefore, it is of particular advantage for this purification to be carried out in two stages by heating the crude anthracene, which generally contains approximately.

40 to 70 % by weight of anthracene
55 to 20 % by weight of phenanthrene
5 to 10 % by weight of carbazole, acridine and other nitrogen-containing heterocyclic compounds together with trinuclear and polynuclear carbocyclic compounds with about twice the quantity of mother liquor obtained from the dissolution and crystallisation of anthraquinone, with stirring to around 90° to 100°C, i.e., to around the melting temperature of the phenanthrene, most of the phenanthrene entering into solution and/or melting and mixing with the solution; this is followed by cooling to around 30°C, i.e., to around room temperature, after which the anthracene thus prepurified is filtered off from the mother liquor and washed with about half to twice the quantity of mother liquor from the dissolution and crystallisation of anthraquinone.

The prepurified anthracene is then heated, with stirring, in about one and a half to two times the quantity of mother liquor from the dissolution and crystallisation of anthraquinone to a temperature of from 100°C to the boiling point of the solvent or solvent mixture and, more particularly, to a temperature of from 120 to 150° C, kept for a while at this temperature, generally for 15 to 60 minutes and more particularly for 30 minutes, subsequently cooled to room temperature, approximately 30°C, and the pure anthracene which has crystallised out is filtered off and washed with about half to the same quantity, by weight, of fresh solvent, i.e., cyclohexanone, or a cyclohexanone/cyclohexanol mixture.

The washing liquid used for this purpose can of course subsequently be used instead of, or to dilute, the mother liquor obtained from the dissolution and crystallisation of anthraquinone, preferably in the second anthracene-purification stage.

The solvent or solvent mixture can be recovered from the mother liquors accumulating during the purification of anthracene in a known manner, for example by distillation.

The solvent circuit is illustrated by the following flow chart:

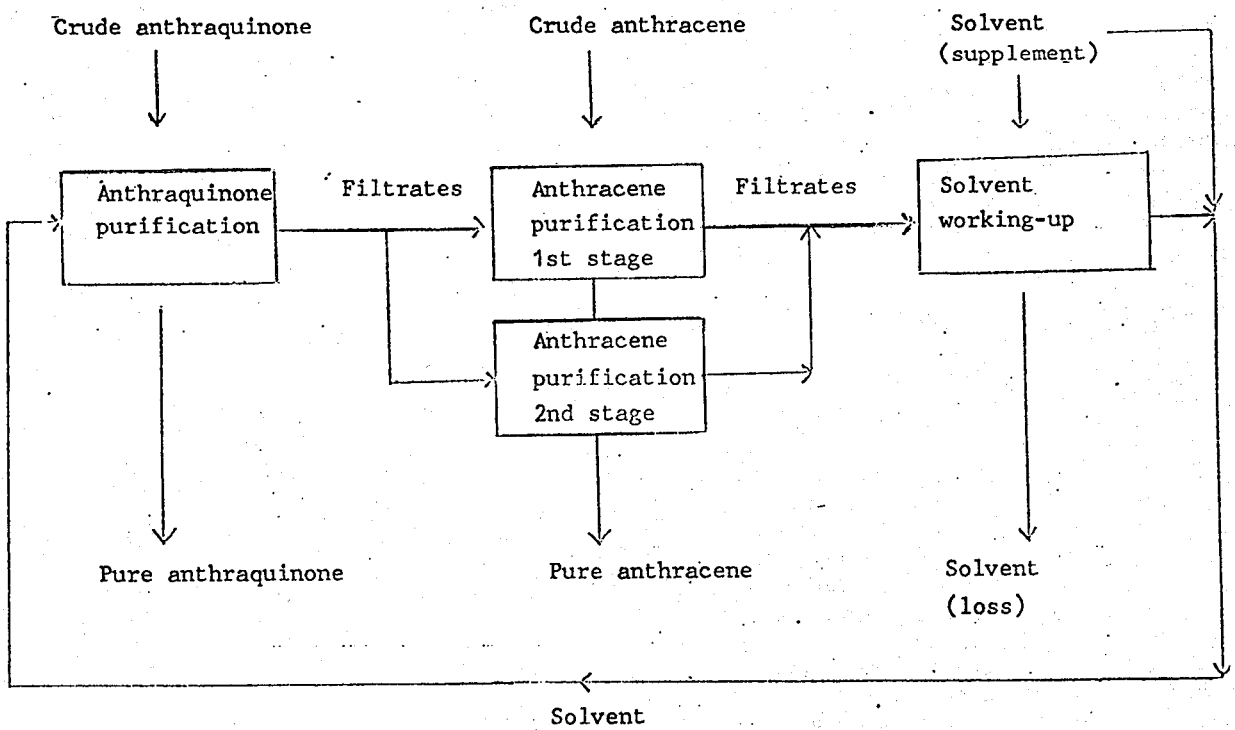

Since a solvent circuit is obtained in practice, even in cases where the process according to the invention is carried out in batches, the process according to the invention can also be carried out with advantage on a continuous basis.

The use of cyclohexanone in accordance with the invention, optionally in admixture with cyclohexanol, for the purification of anthraquinone has a number of advantages:

The lower toxicity of the solvents used in accordance with the invention, compared with the solvents hitherto used in the purification of anthraquinone, reduces the dangers to the personnel carrying out the process. By virtue of these reduced dangers, less elaborate protective measures are required which simplifies the apparatus used in the process.

Another advantage is the smaller amount of energy required for working up and recovering the solvent or solvent mixture in accordance with the invention compared with the amount of energy hitherto required by virtue of the lower boiling point of cyclohexanol compared with those of nitrobenzene and aniline.

In addition, the unreacted anthracene, which is left in the mother liquor obtained from the dissolution and crystallistion of anthraquinone, is separated off with the crude anthracene during its purification and is returned to the anthracene oxidation stage. Another advantage is the aforementioned use of the mother liquor obtained from the dissolution and crystallisation of anthraquinone for purifying the anthracene which now no longer necessitates the use of fresh solvents.

Whereas according to the prior art anthracene and anthraquinone are purified with different solvents which also have to be separately worked up and recovered, so involving inevitable losses the process according to the invention uses one solvent for both purification stages, thus reducing the losses of solvent accompanying working up and recovery.

EXAMPLE 1 a. Purification of anthraquinone 200 g of crude anthraquinone with a content of 92.8 % by weight are heated to 160°C with 1 kg of a cyclohexanone/cyclohexanol mixture (about 1 : 1), and stirred for 30 minutes at this temperature. Any water present in the crude anthraquinone distills off together with a little solvent, and a large part of the anthraquinone is dissolved. This is followed by cooling to 30°C, as a result of which anthraquinone crystallises out. The crystallisate is filtered off under suction and washed with 200 ml of a cyclohexanone/cyclohexanol mixture. Drying in vacuo gives 179 g of anthraquinone with a content of 99.6 % by weight, corresponding to a yield of 96 % of the starting anthraquinone on a pure basis.

The mother liquor contains about 0.9 % by weight of anthracene, 0.3 % by weight of anthraquinone and about 0.4 % by weight of other impurities.

b. Purification of anthracene 300 g of crude anthracene (52.2 % by weight of pure anthracene) are heated to 100°C in 450 ml of anthraquinone mother liquor, stirred for 30 minutes at this temperature and subsequently cooled to 30°C. The undissolved components and the anthracene which has crystallised out are filtered off under suction and washed with 200 ml of the anthraquinone mother liquor. The filter cake is dried in vacuo at 80°C, giving 160 g of anthracene with a content of 94 % by weight of pure anthracene corresponding to 96.1 % by weight of the starting anthracene on a pure basis.

160 g of this prepurified anthracene are heated, with stirring, to 140°C in 275 ml of anthraquinone mother liquor, stirred for about 30 minutes at this temperature and then cooled to 30°C. The solid component is then filtered off under suction, washed with 90 ml of pure cyclohexanone/cyclohexanol mixture (1 : 1) and subsequently dried in vacuo at 80°C.

The yield comprises 147 g of anthracene with a content of 98.3 % by weight of pure anthracene corresponding to 96 % by weight of the prepurified anthracene originally used.

The total yield of anthracene from both purification stages amounts to 92.2 % by weight of the starting anthracene on a pure basis.

EXAMPLE 2 a. Purification of anthraquinone 600 g of crude anthraquinone with a content of 94.6 % by weight of pure anthraquinone are heated with 3.6 kg of cyclohexanone to 156°C and stirred for 30 minutes at this temperature. Small quanitites of water present in the anthraquinone distill off together with a little solvent, and most of the crude anthraquinone is dissolved. This is followed by cooling to 30°C, after which the undissolved component and the anthraquinone which has crystallised out are filtered off under suction and the filter cake washed with 700 g of cyclohexanone. Drying in vacuo gives 551 g of anthraquinone with a content of 99.6 % by weight of pure anthraquinone; this corresponds to a yield of 96.7 % by weight of the starting anthraquinone on a pure basis b. Purification of anthracene 600 g of crude anthracene (54.9 % by weight of pure anthracene) are heated to 100°C in 1000 ml of mother liquor obtained from the purification of anthraquinone and stirred for 30 minutes at this temperature. This is followed by cooling to 30°C, after which the residue and crystallisate are filtered off under suction, and then washed with 200 ml of mother liquor obtained from the purification of anthraquinone. The filter cake is dried in vacuo at 80°C, giving 323 g of anthracene with a content of 93.3 % by weight of pure anthracene corresponding to 91.5 % by weight of the starting anthracene on a pure basis.

175 g of this prepurified anthracene are heated to 140°C in 300 ml of mother liquor obtained from the purification of anthraquinone, and stirred for about 30 minutes at this temperature.

This is followed by cooling to 30°C, after which the residue and crystallisate are filtered off under suction and washed with 100 ml of pure cyclohexanone. The filter cake is dried in vacuo at 80°C, giving 162.5 g of anthracene with a content of 98.9 % by weight of pure anthracene corresponding to a yield of 98.9 % by weight of the starting anthracene on a pure basis. The yield from both stages corresponds to 90.5 % by weight of the starting anthracene on a pure basis.

EXAMPLE 3 a. Purification of anthraquinone 200 g of crude anthraquinone, 94.4 % pure, are heated to 174°C with 1 kg of methyl cyclohexanone isomer mixture, and stirred for 30 minutes at this temperature. Any water present in the anthraquinone distills off together with a little solvent and some of the crude anthraquinone is dissolved. This is followed by cooling to 30°C, filtration under suction and washing with 200 ml of methyl cyclohexanone isomer mixture. Drying in vacuo gives 184 g of 99.6 % pure anthraquinone, corresponding to a yield of 97.1 % of the starting anthraquinone.

b. Purification of anthracene 600 g of crude anthracene (58.0 % pure) are heated to 100°C in 900 ml of filtrate obtained from the purification of crude anthraquinone, stirred for 30 minutes at this temperature, cooled to 30°C and filtered under suction. 400 ml of the same solvent are used for washing. The filter cake is dried in vacuo at 80°C, giving 353 g of 94.6 % pure anthracene, corresponding to 95.9 % of the starting anthracene. These 353 g of anthracene are heated to 140°C with 570 ml of filtrate obtained from the dissolution and crystallisation of crude anthraquinone, stirred for 30 minutes at this temperature, cooled to 30°C, filtered under suction and washed with 190 ml of methyl cyclohexanone isomer mixture. The filter cake is dried in vacuo at 80°C, giving 307 g of anthracene with a content of 99.1 % by weight, corresponding to a yield of 95.9 % of the starting anthracene on a pure basis.

The total anthracene yield from both purification stages amounts to 87.4 % by weight of the starting anthracene on a pure basis.

What is claimed is:

1. Process for purifying anthraquinone which comprises heating crude anthraquinone containing impurities in cyclohexanone or methyl cyclohexanone or in a mixture of cyclohexanone or methyl cyclohexanone and cyclohexanol or methyl cyclohexanol as solvent or solvent mixture up to the boiling point thereof thereby dissolving anthraquinone and said impurities, crystallizing dissolved anthraquinone by cooling to around 30°C while said impurities remain in solution, thereafter recovering and purifying the crystallized anthraquinone.

2. Process of claim 1 wherein a mixture of 3 to 7 parts by weight of cyclohexanone and 7 to 3 parts by weight of cyclohexanol are used as solvent.

3. Process of claim 1 wherein a mixture of equal parts by weight of cyclohexanone and cyclohexanol are used.

* * * * *